US010999323B2

(12) United States Patent
Lumezanu et al.

(10) Patent No.: US 10,999,323 B2
(45) Date of Patent: *May 4, 2021

(54) NETWORK GATEWAY SPOOFING DETECTION AND MITIGATION

(71) Applicant: NEC Laboratories America, Inc., Princeton, NJ (US)

(72) Inventors: Cristian Lumezanu, Princeton Junction, NJ (US); Nipun Arora, Plainsboro, NJ (US); Haifeng Chen, West Windsor, NJ (US); Bo Zong, New York, NY (US); Daeki Cho, Highland Park, NJ (US); Mingda Li, Los Angeles, CA (US)

(73) Assignee: NEC Corporation

( * ) Notice: Subject to any disclaimer, the term of this patent is extended or adjusted under 35 U.S.C. 154(b) by 302 days.

This patent is subject to a terminal disclaimer.

(21) Appl. No.: 16/101,834

(22) Filed: Aug. 13, 2018

(65) Prior Publication Data

US 2019/0098050 A1 Mar. 28, 2019

Related U.S. Application Data

(60) Provisional application No. 62/561,857, filed on Sep. 22, 2017.

(51) Int. Cl.
*G06F 21/00* (2013.01)
*H04L 29/06* (2006.01)
(Continued)

(52) U.S. Cl.
CPC ........ *H04L 63/1483* (2013.01); *G06K 9/6215* (2013.01); *G06N 3/08* (2013.01);
(Continued)

(58) Field of Classification Search
CPC ... H04L 63/1483; H04L 43/026; H04L 45/08; H04L 47/40; H04L 63/1458;
(Continued)

(56) References Cited

U.S. PATENT DOCUMENTS 8,010,993 B1 * 8/2011 Bartholomay ...... G06F 9/45558
726/1
10,057,198 B1 * 8/2018 Chandrasekhar ..... H04L 67/125
(Continued)

FOREIGN PATENT DOCUMENTS

WO WO-2004051946 A1 * 6/2004 ............. H04L 45/00

OTHER PUBLICATIONS

Wang et al. "Defense Against Spoofed IP Traffic Using Hop Count Filtering", IEEE/ACM Transactions on Networking, vol. 15 No. 1, Feb. 2007, pp. 40-53.*

(Continued)

*Primary Examiner* — Lisa C Lewis
(74) *Attorney, Agent, or Firm* — Joseph Kolodka (57) ABSTRACT

Endpoint security systems and methods include a distance estimation module configured to calculate a travel distance between a source Internet Protocol (IP) address and an IP address for a target network endpoint system from a received packet received by a network gateway system based on time-to-live (TTL) information from the received packet. A machine learning model is configured to estimate an expected travel distance between the source IP address and the target network endpoint system IP address based on a sparse set of known source/target distances. A spoof detection module is configured to determine that the received packet has a spoofed source IP address based on a comparison between the calculated travel distance and the expected travel distance. A security module is configured to perform a security action at the network gateway system responsive (Continued)

to the determination that the received packet has a spoofed source IP address.

13 Claims, 8 Drawing Sheets

(51) Int. Cl.
*H04L 12/733* (2013.01)
*H04L 12/26* (2006.01)
*H04L 12/741* (2013.01)
*G06N 20/00* (2019.01)
*H04L 12/751* (2013.01)
*H04L 12/893* (2013.01)
*G06K 9/62* (2006.01)
*G06N 3/08* (2006.01)

(52) U.S. Cl.
CPC .......... *G06N 20/00* (2019.01); *H04L 43/026* (2013.01); *H04L 43/16* (2013.01); *H04L 45/08* (2013.01); *H04L 45/20* (2013.01); *H04L 45/74* (2013.01); *H04L 47/40* (2013.01); *H04L 63/0227* (2013.01); *H04L 63/1416* (2013.01); *H04L 63/1458* (2013.01); *H04L 63/1466* (2013.01); *H04L 63/20* (2013.01); *H04L 69/22* (2013.01); *H04L 2463/141* (2013.01)

(58) Field of Classification Search
CPC . H04L 63/1466; H04L 69/22; H04L 63/1416; H04L 45/20; H04L 63/20; H04L 43/16; H04L 63/0227; H04L 45/74; H04L 2463/141; G06K 9/6215; G06N 3/08; G06N 20/00; G06N 3/084; G06N 3/0445
See application file for complete search history.

(56) References Cited

U.S. PATENT DOCUMENTS

| | | | |
|---|---|---|---|
| 10,673,881 B2 * | 6/2020 | Alderson | H04L 63/10 |
| 2003/0110274 A1 * | 6/2003 | Pazi | H04L 63/164 709/229 |
| 2005/0021999 A1 * | 1/2005 | Touitou | H04L 69/163 726/11 |
| 2005/0180421 A1 * | 8/2005 | Shimada | H04L 63/0236 370/389 |
| 2008/0025231 A1 * | 1/2008 | Sharma | H04L 41/12 370/252 |
| 2015/0074792 A1 * | 3/2015 | Tarreau | H04L 63/0227 726/13 |
| 2015/0381567 A1 * | 12/2015 | Johnson | H04L 45/54 726/12 |
| 2018/0007002 A1 * | 1/2018 | Landgraf | H04L 63/0263 |
| 2018/0176248 A1 * | 6/2018 | Nikravesh | H04L 63/1466 |
| 2020/0028870 A1 * | 1/2020 | Dell'Era | H04L 63/1433 |
| 2020/0128032 A1 * | 4/2020 | Halme | H04L 47/6205 |

OTHER PUBLICATIONS

Brian Eriksson et al., Estimating Hop Distance Between Arbitrary Host Pairs, IEEE INFOCOM 2009, Rio de Janeiro, Apr. 2009, pp. 801-809.

Cheng Jin et al., Hop-Count Filtering: An Effective Defense Against Spoofed DDoS Traffic, CCS'03, Oct. 27-31, 2003, Washington, DC.

* cited by examiner

NETWORK GATEWAY SPOOFING DETECTION AND MITIGATION

RELATED APPLICATION INFORMATION

This application claims priority to 62/561,857, filed on Sep. 22, 2017, incorporated herein by reference in its entirety. This application is related to an application entitled "NEURAL NETWORK BASED SPOOFING DETECTION", and to an application entitled, "NETWORK END-POINT SPOOFING DETECTION AND MITIGATION", which are incorporated by reference herein in their entirety.

BACKGROUND

Technical Field

The present invention relates to computer network security and, more particularly, to the detection of spoofed network traffic.

Description of the Related Art

The term "spoofing" refers to the act of sending traffic on a computer network with incorrect source information. Many attacks, such as distributed denial of service (DDOS) attacks make use of Internet Protocol (IP) spoofing to obscure the source of the attack and to make it difficult to filter unwanted traffic. Spoofing can also be used to mis-identify the source such that a different source system is implicated.

Existing approaches to spoofing detection include network-based and host-based mechanisms. A network-based mechanism creates hash maps that correlate source IP addresses with the interfaces on which the packets from those IP addresses arrive at a router. When a packet arrives at an unexpected router interface, the packet is detected as being spoofed. However, this approach is limited in that it only provides complete protection if all border routers in the internet implement it.

A host-based solution uses end-hosts to maintain information about each IP address. For these approaches to work, however, the destination would need to know the hop count to every possible source IP.

SUMMARY

An endpoint security system implemented in a network gateway system includes a distance estimation module configured to calculate a travel distance between a source Internet Protocol (IP) address and an IP address for a target network endpoint system from a received packet received by a network gateway system based on time-to-live (TTL) information from the received packet. A machine learning model is configured to estimate an expected travel distance between the source IP address and the target network endpoint system IP address based on a sparse set of known source/target distances. A spoof detection module includes a processor configured to determine that the received packet has a spoofed source IP address based on a comparison between the calculated travel distance and the expected travel distance. A security module is configured to perform a security action at the network gateway system responsive to the determination that the received packet has a spoofed source IP address.

A method for mitigating a spoofing-based attack at a network gateway includes calculating a travel distance between a source IP address and an IP address for a target network endpoint system from a received packet received by a network gateway system based on TTL information from the received packet. An expected travel distance between the source IP address and the target network endpoint system IP address is estimated based on a sparse set of known source/target distances. It is determined that the received packet has a spoofed source IP address using a processor based on a comparison between the calculated travel distance and the expected travel distance. A security action is performed at the network gateway system, responsive to the determination that the received packet has a spoofed source IP address.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention makes use of neural networks to build immutable representations for each host in the Internet. The representations are trained using features that cannot be modified by an attacker, such as the hop count between two hosts. The representations of each Internet Protocol (IP) address represent a d-dimensional vector such that the distance between two representations approximates the hop count between the corresponding IP addresses. To detect spoofing, the present embodiments check whether the information in a packet between two hosts matches the representation of the hosts.

In some embodiments, the hop count is used because the attacker can spoof the source IP in a packet, but cannot spoof the time to live (TTL) value, from which the hop count can be determined. Thus, when the representation of the host with the source IP address does not match the hop count information between that host and the destination, the packet is likely spoofed. The present embodiments can thereby operate even on unknown hosts by building a representation on the fly.

Figure 2:
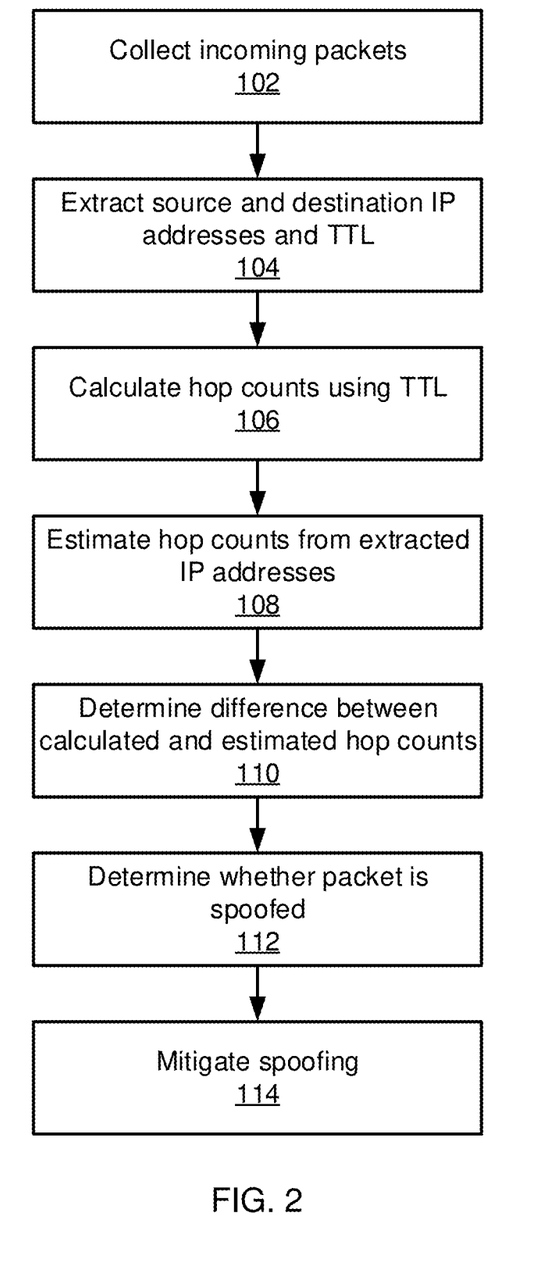
FIG. 2 is a block/flow diagram of a method for mitigating a spoofing-based attack using an estimated distance between source and target systems in accordance with an embodiment of the present invention.

Referring now to FIG. 2, a method of determining whether packets are spoofed is shown. Block 102 collects incoming packets at a network interface. Block 104 then extracts information from the packets. This information may include, for example, the source and destination IP addresses and the TTL. It should be understood that the source IP address may be spoofed and therefore may not correctly identify the system that actually originated the packet. The TTL information, meanwhile, represents a feature of the IPv4 network addressing system that puts a limit on how long an undeliverable packet circulates in a network. It should be understood that the present embodiments are described in the context of an IPv4 system, but other protocols are contemplated such as, e.g., IPv6, where the term TTL is renamed as "hop limit." The present embodiments may be implemented in any appropriate networking system.

In general, the TTL information is represented as an 8-bit integer that counts down to zero. When a system receives a packet having a TTL of zero, and the packet is not destined for that system, the system discards the packet instead of forwarding it. In most implementations, the TTL value is decreased by one each time the packet is forwarded. The maximum value is therefore 255 and the minimum value is 0, with a recommended initial value of 64. Thus, a packet that is initially sent with a TTL of 64 can pass through 64 intermediate hops before it is discarded.

Block 106 calculates the hop count for each packet using the extracted TTL. This can be accomplished by taking the difference between an expected initial TTL value and the extracted TTL value. Block 108 then estimates the expected hop counts from the extracted source and destination IP addresses. This process will be explained in greater detail below. According to the present embodiments, block 108 uses a sparse hop-count matrix between source and destination IP addresses with known hop counts to make this estimate. Block 110 then finds the difference between the calculated and estimated hop counts.

Based on this difference, block 112 determines whether or not each packet is spoofed. It should be understood that the operation of both blocks 108 and 112 may be implemented using respective neural network models for estimation and detection. Although neural network models are specifically contemplated, it should be understood that other forms of machine learning may be employed instead. If block 112 determines that particular packets are spoofed, then block 114 performs a mitigation action that will depend on the location of the device in the network (e.g., whether it is a gateway or an endpoint) and security policies, as described in greater detail below.

Figure 1:
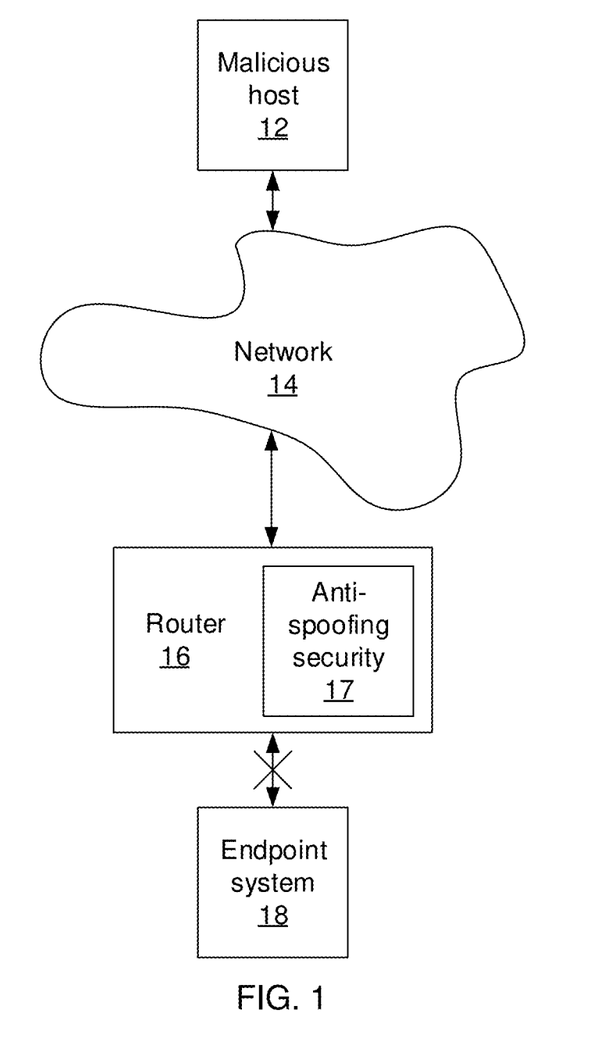
FIG. 1 is a block diagram of a network with an anti-spoofing security system implemented in a router in accordance with an embodiment of the present invention.

Referring now to FIG. 1, an exemplary embodiment of a network having an anti-spoofing security system is shown. A malicious host 12 is in communication with network 14. It should be understood that the malicious host 12 may represent a directed attacker or may, alternatively, represent a compromised system that is operating as part of a "botnet." The malicious host 12 sends spoofed packets to endpoint system 18 through the network 14. At least one router 16 is present in the path between the malicious host 12 and the endpoint system 18.

In the present embodiments, a "router" is used as a general term to designate a system that has both upstream and downstream systems and transmits traffic between them. Router 16 may thus represent a gateway, bridge, firewall, proxy, or any other device that occupies the role of a middlebox between two other devices on a computer network. In contrast, an "endpoint system" is used to designate a system that has only upstream systems in the network and does not forward traffic to any downstream system. Whereas a router 16 processes traffic that is destined for other systems, the endpoint system 18 only processes traffic that is directed to it. Thus, whereas a router 16 will have at least one upstream interface and at least one downstream interface, the endpoint system 18 will only have an upstream interface.

An anti-spoofing security system 17 is used to detect and mitigate spoofing-based attacks. In this embodiment, the anti-spoofing security system 17 is implemented in the router 16, though it should be understood that the anti-spoofing security system 17 may be implemented at any point in the path between the malicious host 12 and the endpoint system 18. The anti-spoofing security system 17 detects and mitigates spoofing attacks by detecting spoofed packets and taking some action such as, e.g., changing network policies with respect to packets claiming the same source IP address that may include, for example, blocking such traffic to prevent it from affecting endpoint systems 18.

Figure 3:
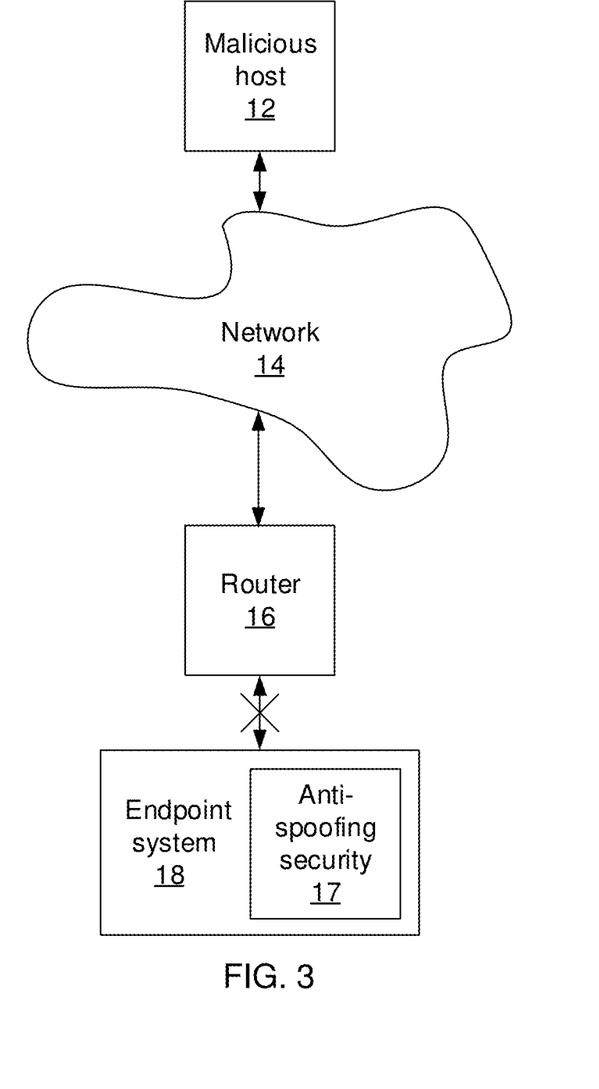
FIG. 3 is a block diagram of a network with an anti-spoofing security system implemented in an endpoint system in accordance with an embodiment of the present invention.

Referring now to FIG. 3, another exemplary embodiment of a network having an anti-spoofing security system is shown. In some embodiments, the anti-spoofing security system 17 is implemented within the endpoint system 18. In such embodiments, the anti-spoofing security system 17 may, for example, locally filter incoming spoofed packets to prevent malicious traffic from affecting the endpoint system 18.

Figure 4:
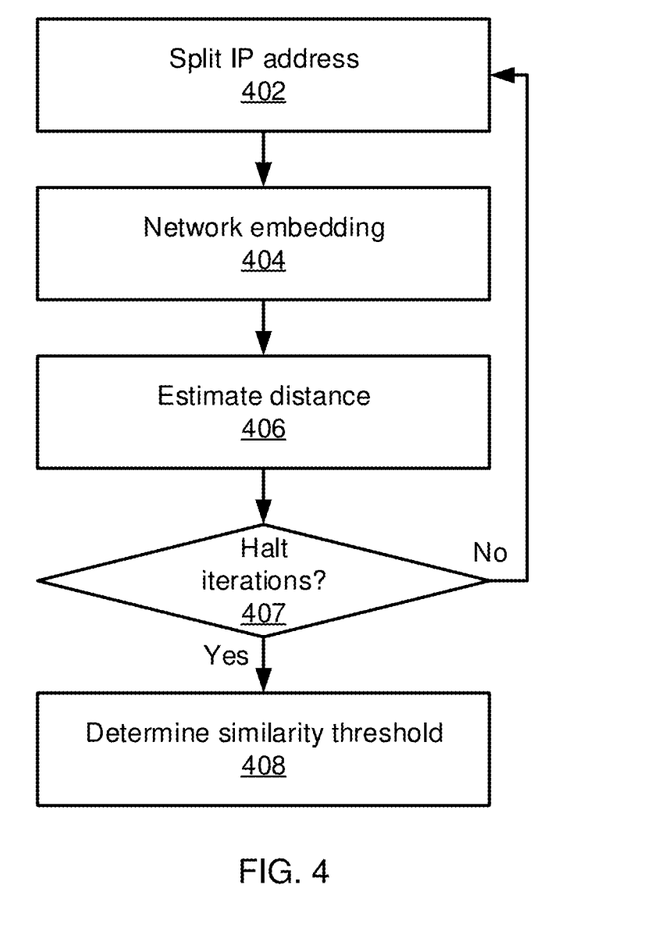
FIG. 4 is a block/flow diagram of a method for training a machine learning model for estimating a distance between two systems in a network in accordance with an embodiment of the present invention.

Referring now to FIG. 4, model training is shown. Block 402 splits the IP address of a host on the network 14. IP addresses, particularly in IPv4, have a hierarchical structure and are assigned in blocks. One consequence of this assignment scheme is that two hosts with similar addresses, for example following the patterns X.X.X.Y and X.X.X.Z, are likely to be in the same physical network, under the same administration and with few hops between them. The present embodiments employ the inherent structure of each host's IP address to ensure that hosts that are close to one another have similar representations. Thus, rather than using the full IP address for model training, only a leading portion of an IP address are used. In one example, for a host having an IP address X.X.X.Y, block 402 may split the IP address and uses only X.X.X. The remaining bits are then split into groups in any appropriate division. One specific example uses three 8-bit portions, but other splits are contemplated including, for example, one 16-bit part and one 8-bit part.

The split IP address is used to form an intermediate representation based solely on the host's IP address and that does not yet take into account the hop count information between hosts. Learning the model is performed using a neural network having several neural network layers (depending on the split) and may be based on recurrent neural networks that use different weight and bias vectors between the neuron layers. This splitting may divide the IP address into a network-portion and a host-portion.

In some embodiments, the IP address may be normalized expressing a 32-bit IP address as a 64-bit number that includes network- and host-portions of the IP address, with each portion being padded to obtain two four-byte values. Each byte of the normalized IP address can then be expressed as a one-hot vector for easier processing, with such vectors having 256 dimensions, where a single '1' value in the vector represents the byte value.

An intermediate representation, based solely on the IP address, can be generated using the IP address's hierarchical structure. Each byte of the IP address may be treated separately, with more significant bytes providing a context for how to interpret less significant bytes. Each byte is therefore provided separately at respective layers of a neural network, as described in greater detail below.

Block 404 performs network embedding to take into account the distance between hosts, which is measured by the number of hops between them. Given the host-to-target hop count matrix, a neural network layer is used to obtain the representation of each host. The target matrix can be incomplete, such that not all hop counts are known between all hosts and all targets. In one illustrative example, only about 10% of the entries in the matrix have non-zero values. The target hop matrix is determined in advance at the target based on extracting hop count information from normal traffic.

Block 406 performs distance estimation. The learning process is iterative and, at every step, the weights and biases of the neural network layers are tuned to improve the estimate. Estimation cost is used as a measure of how good the representation is at every iteration. The estimation cost captures the error between the approximated distance between two hosts (e.g., the distance between their current representations) and the real distance (e.g., the hop count extracted from a packet header TTL value). Once the error goes under a threshold, or when a set number of iterations has been reached, block 407 outputs the final representation.

Once the model training process finishes, each host has a representation that can be used to compute its hop count to another host. This estimation is used to check whether a packet is spoofed or not. If the hop count extracted from the packet at a target similar is similar to the hop count estimated by computing the distance between the target server and the sending host, then the packet is deemed not to have been spoofed. Otherwise the packet is determined to have been spoofed. Block 408 determines the threshold for this similarity, establishing how much error is permitted between a real distance and an approximated distance. If the similarity threshold is too low, then too many good packets will be miscategorized as spoofed, resulting in a high false-positive rate. If the similarity threshold is too high, spoofed packets may escape detection, resulting in a high false-negative rate. Block 408 therefore groups the training data by target and computes statistics (including, e.g., mean, median, 75$^{th}$ percentile, etc.) for each group. Testing is then performed using a dynamic similarity threshold for each target and the threshold is updated after each packet.

The dynamic similarity threshold may be determined as, for example, the mean, median, or 75$^{th}$ percentile for training errors at the target. When testing, when a packet is found to be legitimate (e.g., part of a valid connection), then the mean, median, or 75$^{th}$ percentile value can be recalculated across all legitimate packets seen so far, including those used in training and those seen during testing.

Once the model has been learned, block 108 can use the model to estimate hop counts from new incoming packets. Similar to the training described above, block 108 uses the source IP address and TTL value extracted from each packet. If there exists a representation for the source IP in the model, then block 108 estimates the distance between the source IP and destination IP representations. If the estimation matches the real distance extracted from the TTL value, within the similarity threshold, then the packet is allowed to pass.

In the case where the source IP is unknown, such that the model does not include a representation for the source IP address, then block 108 computes a representation on the fly based solely on the source IP structure and potentially on other domain-based knowledge, such as the autonomous system number (ASN) membership. In some embodiments, unknown IP addresses can be pre-computed during model training.

Figure 5:
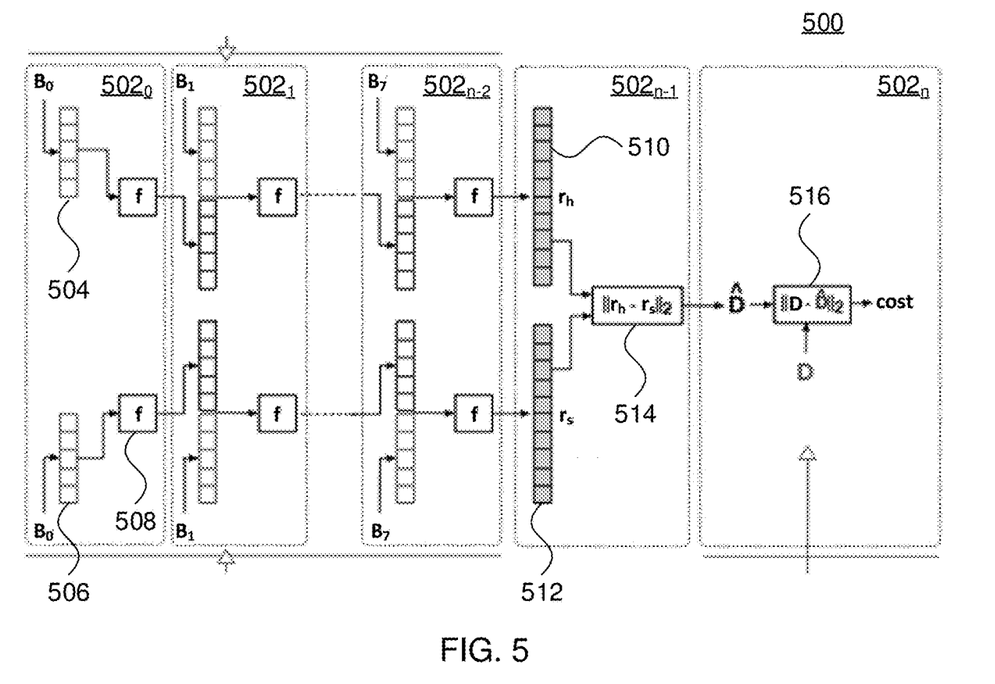
FIG. 5 is a diagram of a neural network machine learning model configured to estimate a distance between two systems in a network in accordance with an embodiment of the present invention.

Referring now to FIG. 5, the structure of a neural network 500 is shown. The neural network 500 includes a number of layers 502$_n$, including one for each byte of the source and destination IP addresses, a hop count estimation layer, and an estimation cost layer. Thus, in embodiments that use normalized IP addresses that are eight bytes long, the neural network 500 will include nine layers 502. In such embodiments, each of the first eight layers (e.g., 502$_0$ to 502$_7$) accept as input one byte 504 from the source IP address and one byte 506 from the destination IP address. In the first layer 502$_0$, these input bytes are each passed to an activation function (also known as a neuron) 508. In subsequent input layers (e.g., 502$_1$ to 502$_7$), the output of the previous layer is concatenated with a new input byte 504/506 before being passed to an activation function 508. The output of the last byte layer 502$_{n-2}$ includes an intermediate representation of the host IP 510 and of the target IP 512.

Once each byte from the IP addresses have been input to their respective layers of the neural network 500, the final byte-layer 502$_{n-2}$ outputs a host IP representation 510 (designated r$_h$) and a target IP representation 512 (designated r$_s$) to hop count estimation layer 502$_{n-1}$. Neuron 514 calculates the estimated hop as the Euclidean norm of the difference between the two representations, $\|r_h - r_s\|_2$. The hop count estimation layer 502$_{n-1}$ outputs the estimated hop count $\hat{D}$ to the estimation cost layer 502$_n$.

The hop count estimation layer 502$_n$ takes the estimated hop count $\hat{D}$ and the real hop count D (determined from the TTL information in the packet) and finds the Euclidean norm of the difference between these two values. The output cost is used by block 407 to determine, for example, whether further training is needed.

Following the above example, the input to the i$^{th}$ layer may be represented as follows:

$$\text{Input } i = \begin{cases} i = 1 & B_{256 \times 1}^{i=0} \\ i \in \{1, \ldots, n\} & \text{concat}(f_{d \times 1}^{i-1}, B_{256 \times 1}^{i}) \end{cases}$$

where d is the dimension of the final IP representation and concat represents the vector concatenation operation. The value $B_{256 \times 1}^i$ is a byte value for a portion of a normalized IP address. At each layer 502$_n$, the activation function $f^i$ is given by:

$$f^i = \begin{cases} i = 1 & \text{softsign}(w_{d \times 256}^{j=0} \times B_{256 \times 1}^{i=0} + b_{d \times 1}^{i=0}) \\ i \in \{1, \ldots, n\} & \text{softsign}\begin{pmatrix} w_{d \times (256+d)}^{i \in \{1, \ldots, n\}} \times \\ \text{concat}(B_{256 \times 1}^{i \in \{1, \ldots, n\}}, f_{d \times 1}^{i-1}) + b_{d \times 1}^{i \in \{1, \ldots, n\}} \end{pmatrix} \end{cases}$$

where $w_{d \times (256+d)}^i$ represents weights and $b_{d \times 1}^i$ represents biases. The softsign function is expressed as $$f(x) = \frac{1}{1+|x|}.$$

Random values are initially assigned to all weights and zeroes are assigned to all biases. The softsign function may be used as the activation function for ease of training, as it is robust to saturation, but it should be understood that other activation functions may be used instead.

Based on the above, the estimated hop count matrix $\hat{D}$ is expressed as:

$$\hat{D}_{h \times s} = \text{Euclidean}(H_{h \times d}, S_{h \times d})$$

where $H_{h \times d}$ and $S_{h \times d}$ are the host IP representation 510 and the target IP representation, respectively, 512 in matrix form. The estimated hop counts $\hat{D}$ are compared in block 406 to the real hop counts matrix $D_{h \times s}$ to compute the cost as the mean difference of hop counts. Because the real hop count matrix is sparse, only the valid entries are computed:

$$\text{Cost} = \frac{\sum_{i=1}^{h} \sum_{j=1}^{s} W^{(i,j)}(\| r_{x \times 1}^{H_i \in \{1,\ldots,h\}} - r_{x \times 1}^{S_j \in \{1,\ldots,s\}} \| - D^{i,j})}{\text{count of nonzero } D^{i,j}}$$

where $D^{i,j}$ represents the value of the element at the $i^{th}$ row and $j^{th}$ column in the matrix D. The values $$r_{x \times 1}^{H_i \in \{1,\ldots,h\}} \text{ and } r_{x \times 1}^{S_j \in \{1,\ldots,s\}}$$

are rows in the matrices $H_{h \times d}$ and $S_{h \times d}$ respectively and correspond to the representation of a host or target in the embedding space. W is a binary value matrix having elements defined as:

$$W^{i,j} = \begin{cases} 0 & D^{i,j} == 0 \\ 1 & D^{i,j} \neq 0 \end{cases}$$

To minimize the cost value over iterations, a back propagation method based on gradient descent is used to automatically tune the learning rate during training.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
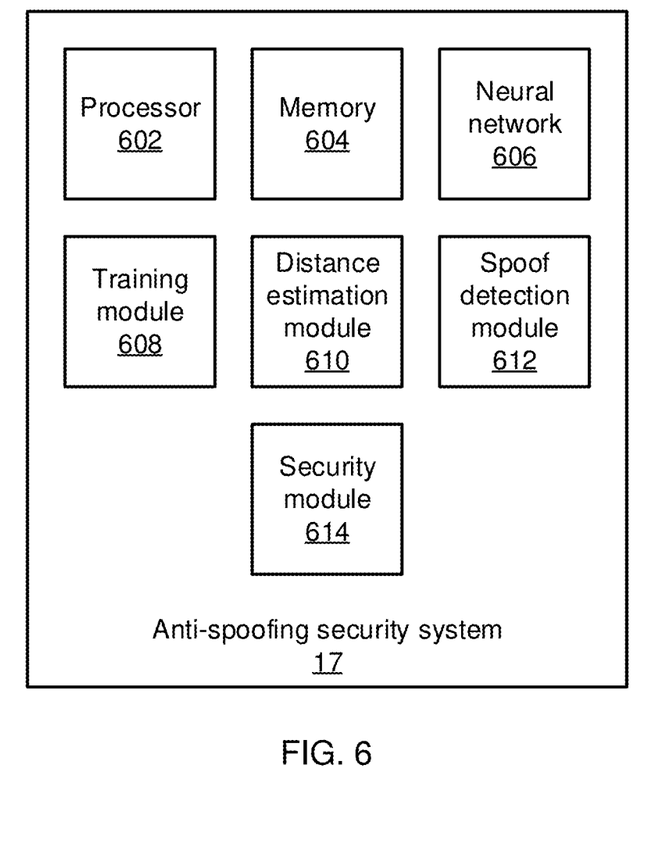
FIG. 6 is a block diagram of an anti-spoofing security system configured to mitigate a spoofing-based attack using an estimated distance between source and target systems in accordance with an embodiment of the present invention.

Referring now to FIG. 6, detail on the anti-spoofing security system 17 is shown. The security system 17 includes a hardware processor 602 and memory 604 as well as a neural network 606. The neural network 606 may be implemented as hardware, for example in the form of a system of neurons and weights configured to perform calculations in a feed forward operation and to change the values of the weights in a back propagation operation. The neural network 606 may alternatively be embodied as software that is stored in memory 604 and that is executed by the hardware processor 602. The system 17 further includes one or more functional modules that may similarly be implemented as software stored in memory 604 and executed by processor 602 or that may be implemented in one or more discrete hardware components in the form of, e.g., application-specific integrated chips or field programmable gate arrays.

A training module 608 trains the neural network 606 using a combination of feed forward operations and back propagation operations, using a set of training data to set values for the weights in the manner described above to minimize the estimation cost function. A distance estimation module 610 then uses the trained neural network to find a predicted distance between a source IP address and a target IP address for a received packet using, at least, the structural information embedded in the IP addresses themselves to establish correspondences to known hosts. A spoof detection module 612 compares the estimated distance to a true distance determined by, e.g., TTL information transmitted with the received packet. Based on the comparison, the spoof detection module 612 determines whether the received packet's source IP address is spoofed.

In some embodiments, the spoof detection module 612 may have multiple thresholds when measuring a degree of mismatch between the estimated distance and the true distance. For example, a first threshold may represent an ambiguous spoofing event, for a relatively small mismatch, while a second threshold may represent a high-probability spoofing event, for a larger mismatch.

A security module 614 takes an appropriate action to stop or mitigate the effect of the spoofed traffic. The specific action taken may depend on factors that include the location of the anti-spoofing security system 17 within the larger network (e.g., whether the anti-spoofing security system is implemented in a router 16 or in an endpoint system 18), on local security policies, and on a degree of mismatch between the estimated distance and the true distance. For example, if the anti-spoofing security system 17 is implemented in a router 16, the security module 614 can block spoofed traffic from being transmitted to downstream systems. If the anti-spoofing security system 17 is implemented in an endpoint system 18, the security module 614 can prevent the traffic from reaching on-system applications and services. In either case, the security module 614 may log the event and may send instructions to monitoring services and/or upstream devices. A further option is to enable deep packet inspection for incoming packets from the spoofed source or from other sources in the same network as the spoofed source. For example, an endpoint system 18 that detects a spoofing attack can generate an alert to a system administrator or can directly trigger a change in routing policies at an upstream router 16.

Figure 7:
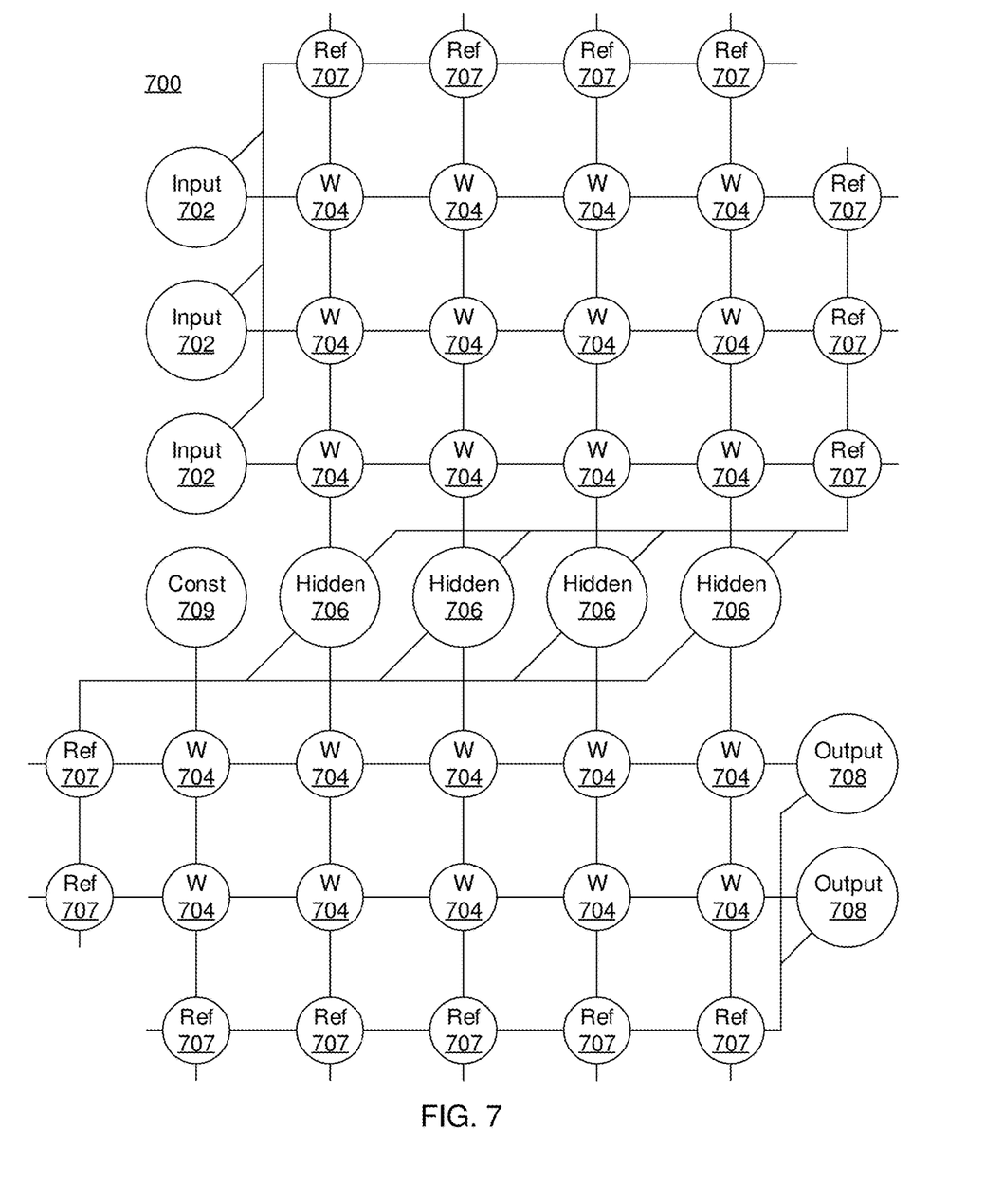
FIG. 7 is a block diagram of an exemplary neural network architecture in accordance with an embodiment of the present invention.

Referring now to the drawings in which like numerals represent the same or similar elements and initially to FIG. 7, an artificial neural network (ANN) architecture 700 is shown. It should be understood that the present architecture is purely exemplary and that other architectures or types of neural network may be used instead. The ANN architecture 700 may thus be used to represent the neural network 606, but any other appropriate structure, having any appropriate number of layers composed of any appropriate number of respective neurons, may be used instead. As noted above, the ANN architecture 700 may be implemented in software or in hardware. The present embodiments describe a specific hardware embodiment for the sake of understanding the mechanisms of neural networks, but it should not be interpreted as limiting in any way.

During feed-forward operation, a set of input neurons 702 each provide an input signal in parallel to a respective row of weights 704. The weights 704 each have a settable weight value, such that an output flows from the weight 704 to a respective hidden neuron 706 to represent the weighted input. In a hardware embodiment, where the input signal is implemented as a voltage and where the weights are implemented as resistances, a current output by a given weight is determined as $$I = \frac{V}{r},$$

where V is the input voltage from the input neuron 702 and r is the set resistance of the weight 704. The current from each weight adds column-wise and flows to a hidden neuron 706. A set of reference weights 707 have a fixed resistance and combine their outputs into a reference current that is provided to each of the hidden neurons 706. Because conductance values can only be positive numbers, some reference conductance is needed to encode both positive and negative values in the matrix. The currents produced by the weights 704 are continuously valued and positive, and therefore the reference weights 707 are used to provide a reference current, above which currents are considered to have positive values and below which currents are considered to have negative values.

As an alternative to using the reference weights 707, another embodiment may use separate arrays of weights 704 to capture negative values. Each approach has advantages and disadvantages. Using the reference weights 707 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 704 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 706 use the currents from the array of weights 704 and the reference weights 707 to perform some calculation. The hidden neurons 706 then output a voltage of their own to another array of weights 704. This array performs in the same way, with a column of weights 704 receiving a voltage from their respective hidden neuron 706 to produce a weighted current output that adds row-wise and is provided to the output neuron 708.

It should be understood that any number of these stages may be implemented, by interposing additional layers of arrays and hidden neurons 706. It should also be noted that some neurons may be constant neurons 709, which provide a constant voltage to the array. The constant neurons 709 can be present among the input neurons 702 and/or hidden neurons 706 and are only used during feed-forward operation.

During back propagation, the output neurons 708 provide a voltage back across the array of weights 704. The output layer compares the generated network response to training data and computes an error. The error is applied to the array as a voltage pulse, where the height and/or duration of the pulse is modulated proportional to the error value. In this example, a row of weights 704 receives a voltage from a respective output neuron 708 in parallel and converts that voltage into a current which adds column-wise to provide an input to hidden neurons 706. The hidden neurons 706 combine the weighted feedback signal with a derivative of its feed-forward calculation and stores an error value before outputting a feedback signal voltage to its respective column of weights 704. This back propagation travels through the entire network 700 until all hidden neurons 706 and the input neurons 702 have stored an error value.

During weight updates, the input neurons 702 and hidden neurons 706 apply a first weight update voltage forward and the output neurons 708 and hidden neurons 706 apply a second weight update voltage backward through the network 700. The combinations of these voltages create a state change within each weight 704, causing the weight 704 to take on a new resistance value. In this manner the weights 704 can be trained to adapt the neural network 700 to errors in its processing. It should be noted that the three modes of operation, feed forward, back propagation, and weight update, do not overlap with one another.

Figure 8:
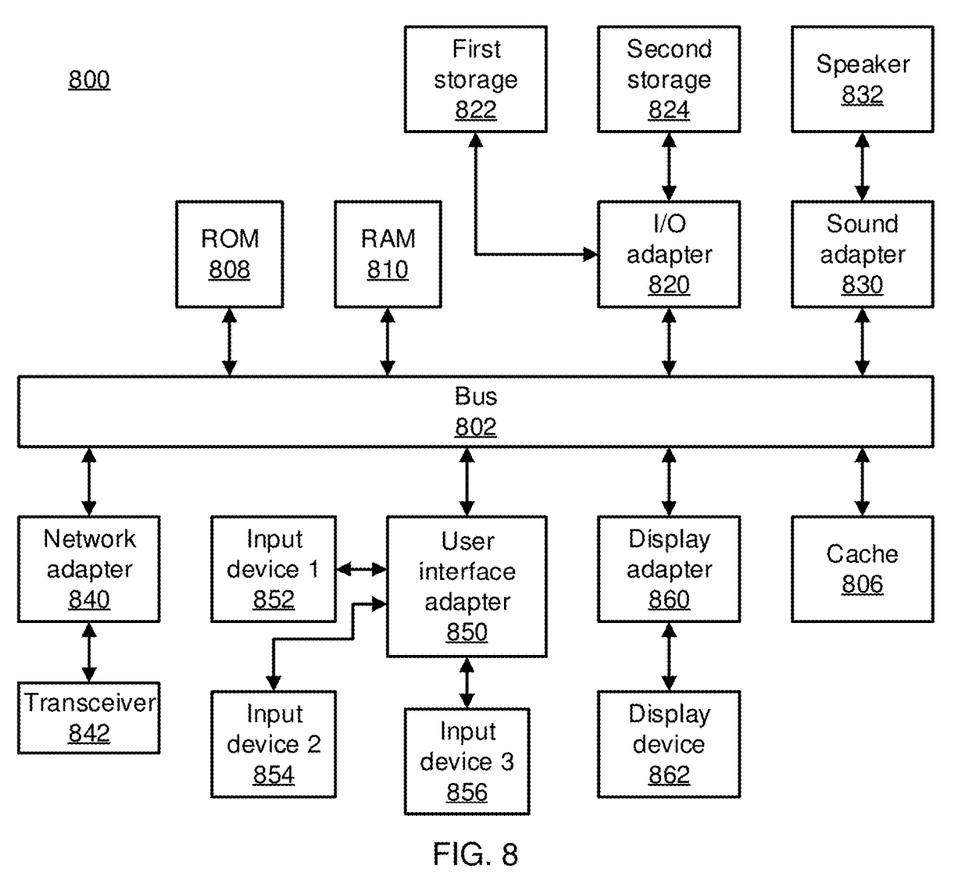
FIG. 8 is a block diagram of an exemplary processing system in accordance with an embodiment of the present invention.

Referring now to FIG. 8, an exemplary processing system 800 is shown which may represent the anti-spoofing security system 17. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An endpoint security system implemented in a network gateway system, comprising:
    a hardware processor; and
    a memory, configured to store computer program code that, when executed by the hardware processor, performs a security action, the computer program code including:
        distance estimation code that calculates a travel distance between a source Internet Protocol (IP) address and an IP address for a target network endpoint system from a received packet received by the network gateway system based on time-to-live (TTL) information from the received packet;
        spoof detection code that determines structural correspondences between the source IP address and one or more known source IP addresses, that splits the source IP address into at least a beginning portion and an end portion, that pads the beginning portion and the end portion to form a normalized source IP address, that estimates an expected travel distance between the source IP address and the target network endpoint system IP address based on a sparse set of known source/target distances, using a machine learning model, and that determines that the received packet has a spoofed source IP address based on a comparison between the calculated travel distance and the expected travel distance; and
        security code that performs a security action at the network gateway system responsive to the determination that the received packet has a spoofed source IP address.

2. The system of claim 1, wherein the spoof detection code further provides the source IP address and the target network endpoint system IP address to a neural network, where an activation function for neurons in the neural network is determined as:

$$f^i = \begin{cases} i = 1 & softsign(w_{d \times 256}^{j=0} \times B_{256 \times 1}^{i=0} + b_{d \times 1}^{j=0}) \\ i \in \{1, \ldots, n\} & softsign\left(\begin{array}{c} w_{d \times (256+d)}^{i \in \{1,\ldots,n\}} \times \\ concat(B_{256 \times 1}^{i \in \{1,\ldots,n\}}, f_{d \times 1}^{i-1}) + b_{d \times 1}^{i \in \{1,\ldots,n\}} \end{array}\right) \end{cases}$$

where i is a layer of the neural network, $w_{d \times 256}^i$ is a set of weights, d is a dimension of a final IP representation, $B_{256 \times 1}^{i=0}$ is a byte value from a normalized IP address, $b_{d \times 1}^i$ is a set of biases, and n is a number of bytes in the normalized IP address.

3. The system of claim 1, wherein the computer program product further includes training code that trains a neural network to estimate distances between an input source IP address and an input destination IP address based on training data that comprises a sparse matrix of distances between known source IP addresses and destination IP addresses.

4. The system of claim 1, wherein the distance estimation code further finds a difference between the TTL information from the received packet and a default initial TTL value.

5. The system of claim 1, wherein the spoof detection code further determines a difference between the calculated travel distance and the expected travel distance and comparing the determined difference to a threshold value.

6. The system of claim 1, wherein the security action comprises at least one action selected from the group consisting of blocking traffic from the source IP address of the received packet, changing a system security policy, changing a packet filtering setting on an upstream device, discarding the packet, and performing deep packet inspection.

7. The system of claim 1, wherein the machine learning model is a neural network model.

8. A method for mitigating a spoofing-based attack at a network gateway, comprising:
calculating a travel distance between a source Internet Protocol (IP) address and an IP address for a target network endpoint system from a received packet received by a network gateway system based on time-to-live (TTL) information from the received packet;
estimating an expected travel distance between the source IP address and the target network endpoint system IP address based on a sparse set of known source/target distances, by determining structural correspondences between the source IP address and one or more known source IP addresses, including splitting the source IP address into at least a beginning portion and an end portion, and padding the beginning portion and the end portion to form a normalized source IP address;
determining that the received packet has a spoofed source IP address using a processor based on a comparison between the calculated travel distance and the expected travel distance; and
performing a security action at the network gateway system, responsive to the determination that the received packet has a spoofed source IP address.

9. The method of claim 8, wherein estimating the expected travel distance comprises providing the source IP address and the target network endpoint system IP address to a neural network, where an activation function for neurons in the neural network is determined as:

$$f^i = \begin{cases} i = 1 & \mathit{softsign}(w^{j=0}_{d \times 256} \times B^{i=0}_{256 \times 1} + b^{i=0}_{d \times 1}) \\ i \in \{1, \ldots, n\} & \mathit{softsign}\left( \begin{array}{c} w^{j \in \{1,\ldots,n\}}_{d \times (256+d)} \times \\ \mathrm{concat}(B^{i \in \{1,\ldots,n\}}_{256 \times 1}, f^{i-1}_{d \times 1}) + b^{\{i \in 1,\ldots,n\}}_{d \times 1} \end{array} \right) \end{cases}$$

where i is a layer of the neural network, $w_{d \times 256}{}^i$ is a set of weights, d is a dimension of a final IP representation, $B_{256 \times 1}{}^{i=0}$ is a byte value from a normalized IP address, $b_{d \times 1}{}^i$ is a set of biases, and n is a number of bytes in the normalized IP address.

10. The method of claim 8, further comprising training a neural network to estimate distances between an input source IP address and an input destination IP address based on training data that comprises a sparse matrix of distances between known source IP addresses and destination IP addresses.

11. The method of claim 8, wherein calculating the travel distance comprises finding a difference between the TTL information from the received packet and a default initial TTL value.

12. The method of claim 8, wherein determining that the received packet has a spoofed source IP address comprises determining a difference between the calculated travel distance and the expected travel distance and comparing the determined difference to a threshold value.

13. The method of claim 8, wherein performing the security action comprises at least one action selected from the group consisting of blocking traffic from the source IP address of the received packet, changing a system security policy, changing a packet filtering setting on an upstream device, discarding the packet, and performing deep packet inspection.

* * * * *